Patented July 30, 1946

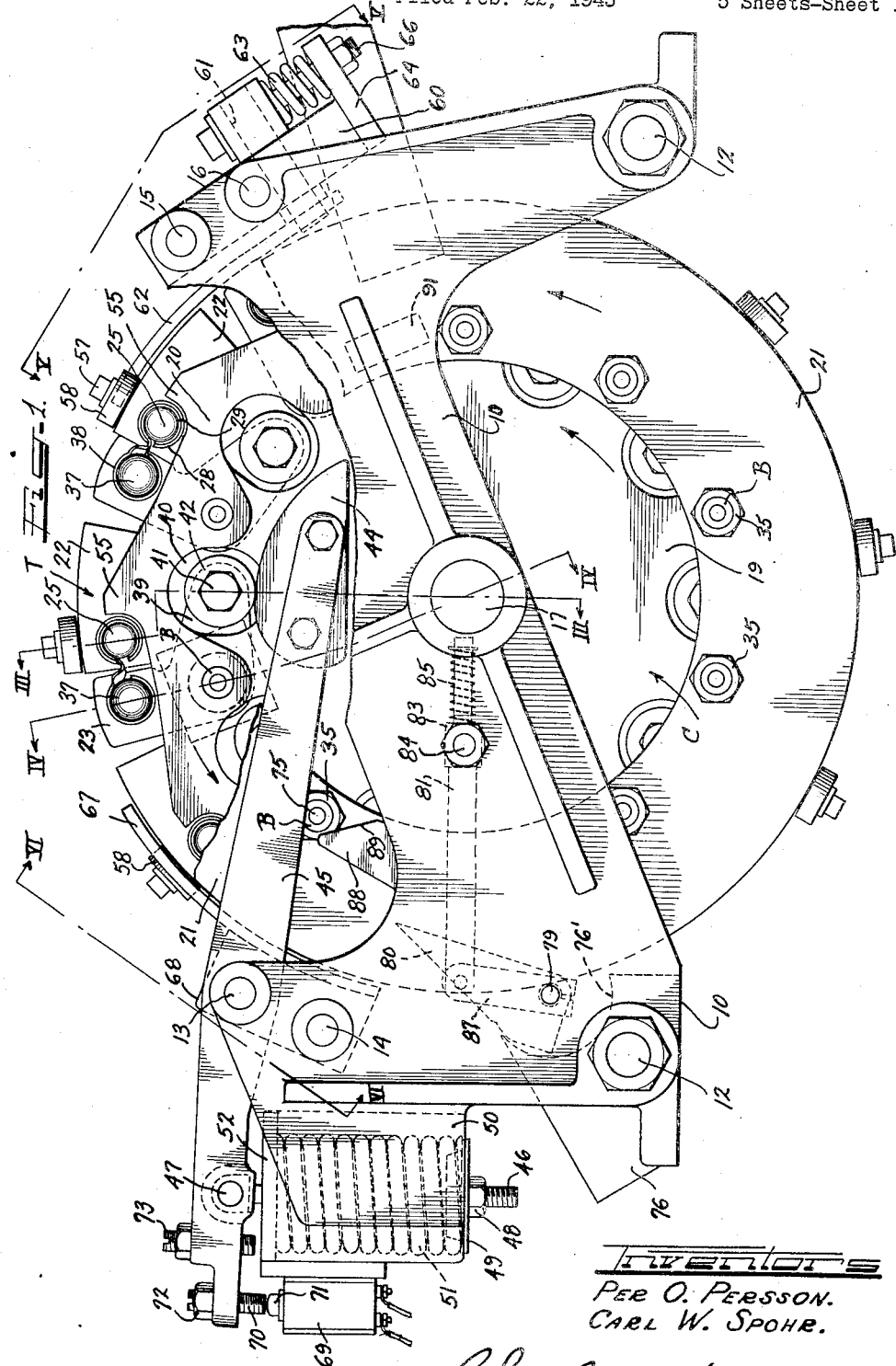

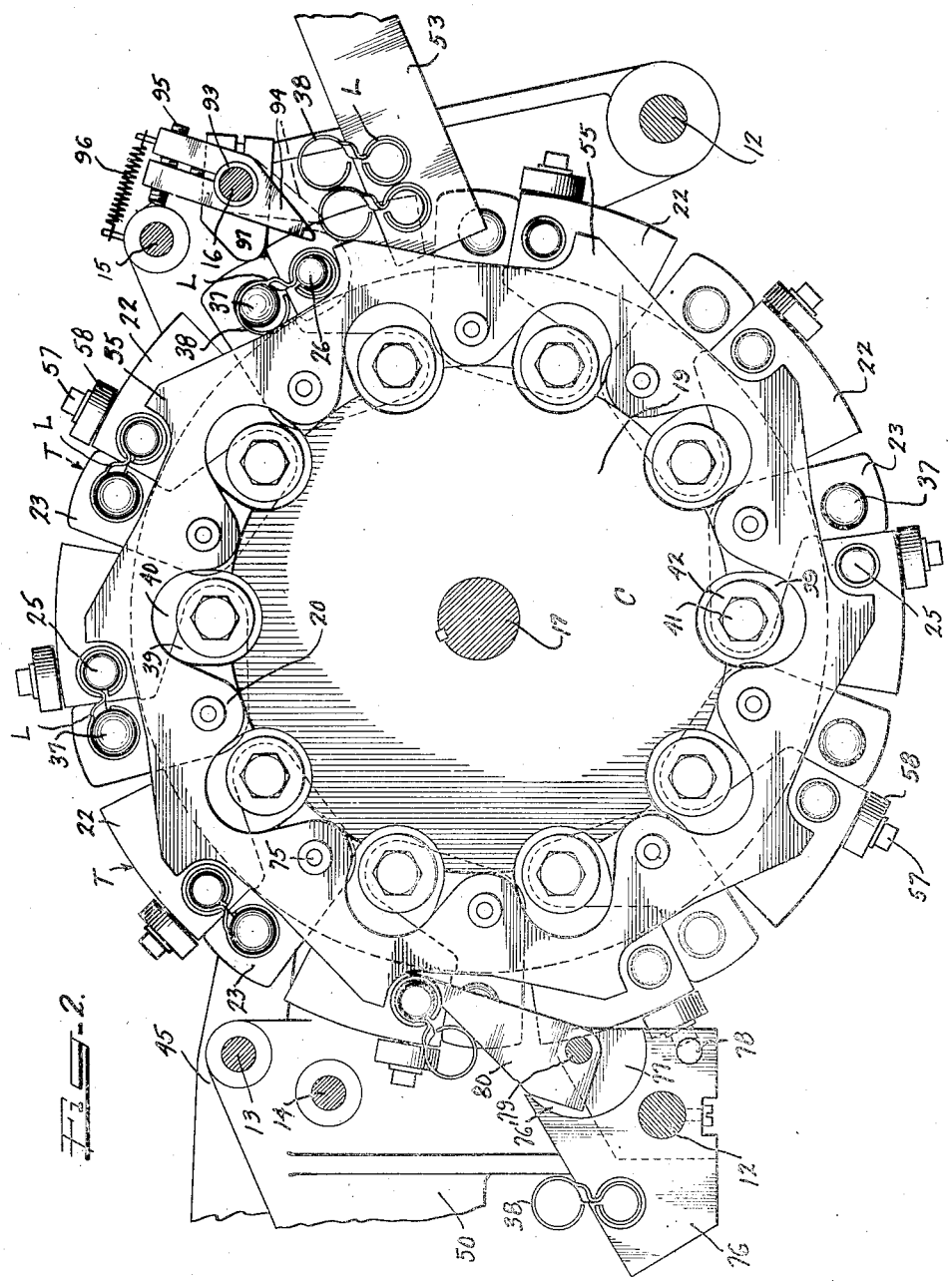

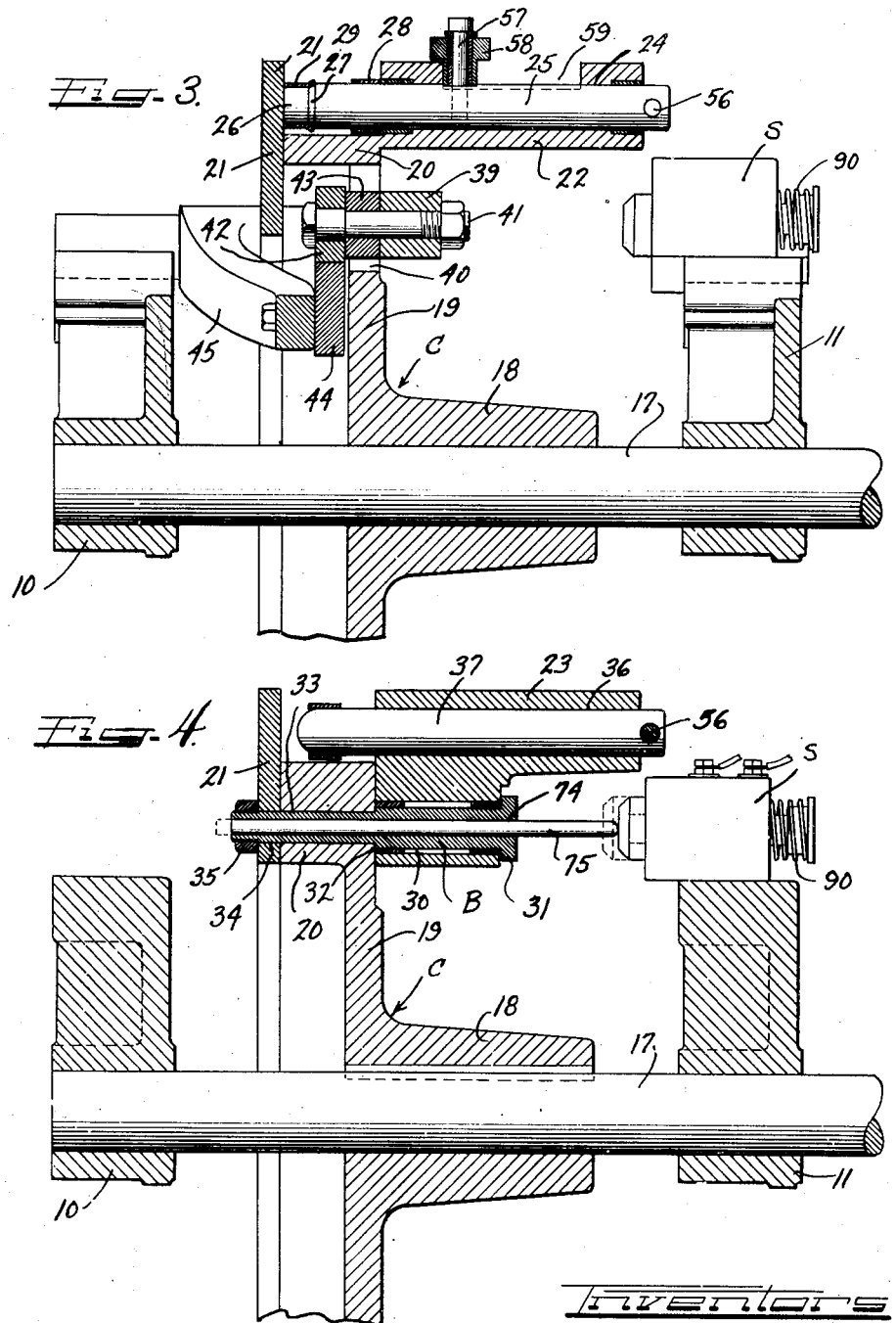

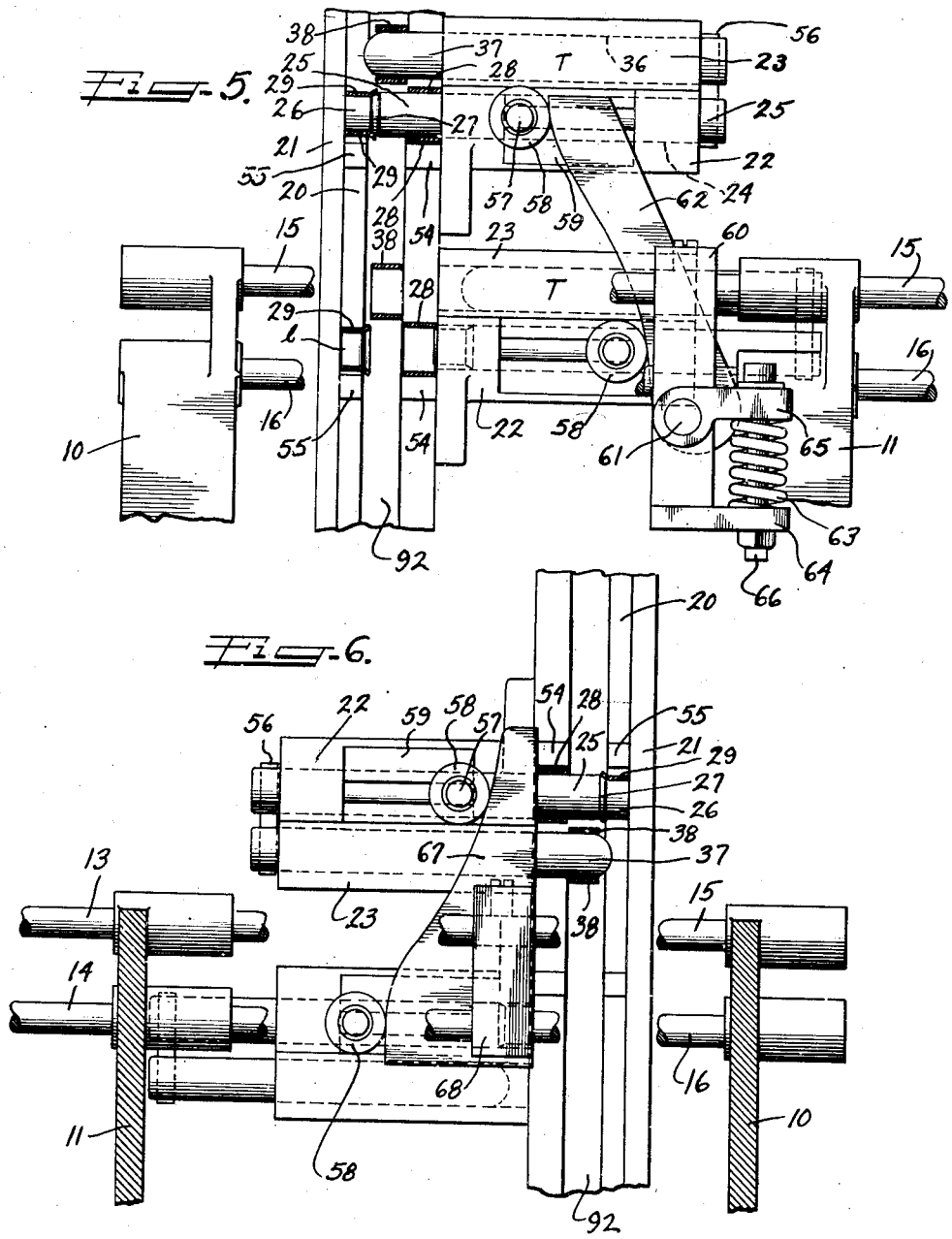

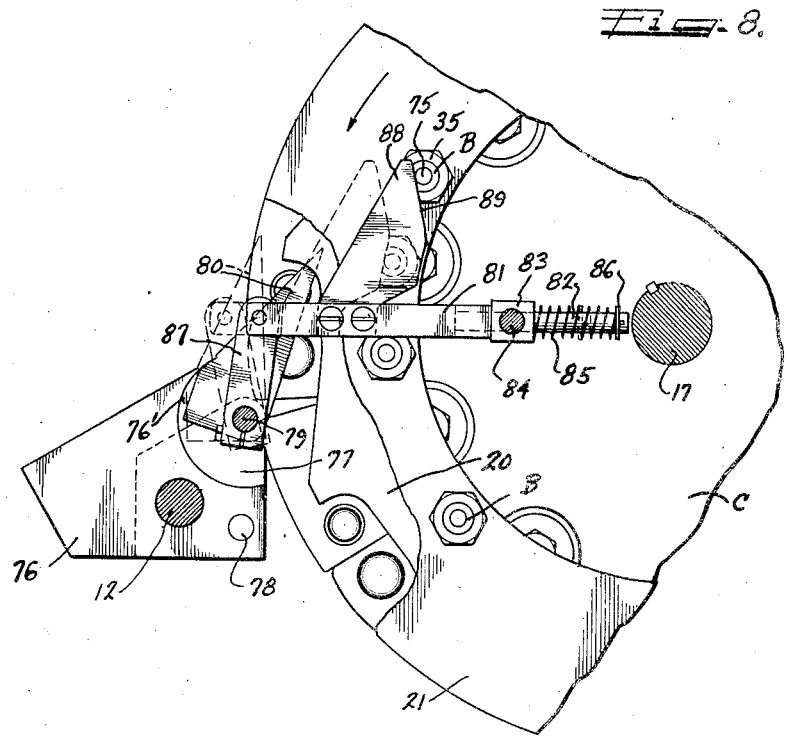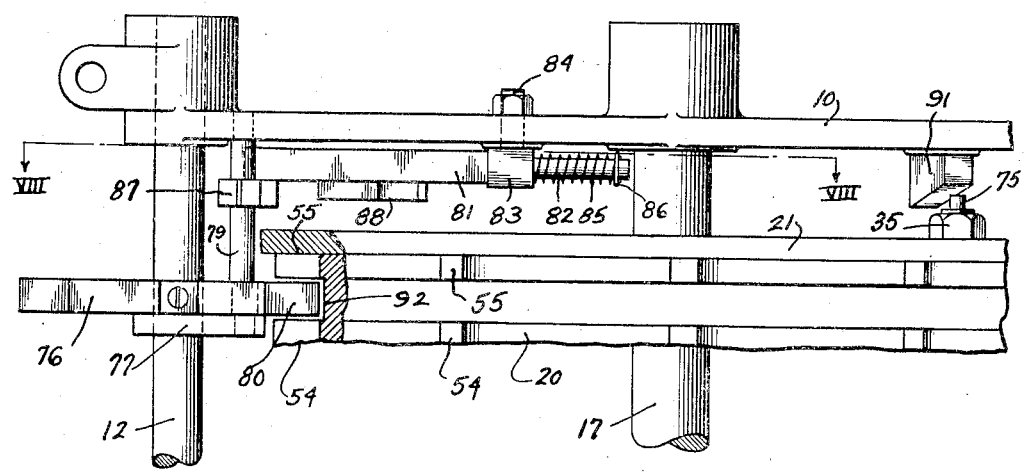

2,405,098

UNITED STATES PATENT OFFICE 2,405,098

TESTING MACHINE FOR METALLIC CARTRIDGE BELT LINKS

Per O. Persson, South Bend, Ind., and Carl W. Spohr, Chicago, Ill., assignors to the United States of America, as represented by the Secretary of War Application February 22, 1943, Serial No. 476,746

7 Claims. (Cl. 209—79)

This invention relates to machines for testing metallic cartridge belt links such as the type of links disclosed in Laystrom Patent No. 2,232,071, dated February 8, 1941, by subjecting the links to a stretch test such as is performed by the testing machine disclosed in Laystrom and Persson Patent No. 2,286,286, dated June 16, 1942.

In the machine of the Laystrom and Persson patent referred to, the links are fed into a vertical passageway and a single pair of separable test arbors mounted on a stationary frame, are controlled to project into the passageway for reception and stretch test of the links.

An important object of our invention is to produce a testing machine of greater capacity in which a plurality of testing arbor sets are provided for successively receiving links for subjection to the stretch test.

A further object is to provide a machine in which a plurality of test arbor sets are mounted on a rotatable carrier for bodily travel through an orbit, with links to be tested being fed to the carrier from one side thereof and tested links delivered from the opposite side thereof.

Another object is to provide cam means in the path of the traveling test arbor sets for successively projecting the arbors for reception of links and for retraction of the arbors from a tested link, together with other means for subjecting the links to stretch tension.

Still another object is to provide improved means controlled by the stretch subjecting mechanism for side-tracking from the machine such links which have failed to pass the test by being stretched beyond the predetermined tolerance.

The above enumerated and other features of the invention are embodied in the structure shown on the drawings, in which Figure 1 is a front elevation of the machine;

Figure 2 is a front elevation of the link carrier;

Figure 3 is a section on plane III—III of Figure 1;

Figure 4 is a section on plane IV—IV of Figure 1;

Figure 5 is a section on plane V—V of Figure 1;

Figure 6 is a section on plane VI—VI of Figure 1;

Figure 7 is a bottom view of a portion of the machine to show the ejector controlling mechanism; and Figure 8 is a section on plane VIII—VIII of Figure 7.

The supporting structure for the machine comprises front and rear walls 10 and 11 spaced apart at their lower corners by bolts 12 and spaced apart by cross bars 13 and 14 at the left ends of the walls and cross bars 15 and 16 at the right ends of the walls. Intermediate the ends of the walls a drive shaft 17 is journalled in the walls and this shaft may be driven in any suitable manner from a suitable driving source (not shown). Between the front and rear walls is the carrier structure C which comprises the hub 18 keyed to the drive shaft 17, and a web or disk 19 extending from the front part of the hub and terminating in the peripheral flange or rim 20 extending forwardly therefrom. An annular covering or abutment plate 21 is secured against the front face of the carrier rim 20, concentric with the carrier, as by means of special bolts B, which will be referred to more in detail later. The plate 21 is of an outer diameter so that the plate will project a distance beyond the outer surface of the rim 20, as clearly shown on Figure 4.

The carrier C supports a plurality of testing sets T equally spaced around the periphery thereof, ten such sets being shown, although any other suitable number may be used. Each testing set comprises test arbor frames 22 and 23. The frames 22 are rigid with the carrier and may be an integral part of the carrier casting, as shown on Figure 3. Each frame 22 has a bore 24 therethrough for an arbor 25 movable therein for projection of its front end across the periphery of the carrier rim 20. The front end 26 of each arbor 25 is of reduced diameter with a conical shoulder 27 between this end and the main part of the arbor. These arbors 25 function to receive the cartridge receiving loops 28 and 29 of the links, the loops 29 being of reduced diameter and flared to receive the ends 26 and shoulders 27 of the arbors, as shown on Figures 3, 4 and 5.

The arbor frames 23, like the arbor frames 22, extend rearwardly from the rim 20 of the carrier, but are movable relative to their associated arbor frames 22. As best shown on Figures 1 to 4, the arbor frames 23 are fulcrumed at their lower ends on the bolts B hereinbefore referred to. As best shown on Figure 4, the bolts B extend through the bores 30 in the frames 23 with their heads 31 engaging against the sides of the frames and with their shoulders 32 engaging against the rear side of the carrier web 19, the reduced front portions of the bolts beyond their shoulders 32 extending through openings 33 through the carrier rim 20 and through openings 34 in the plate 21, the front ends of the bolts being threaded for reception of nuts 35 so that the bolts, besides providing fulcrums for the arbor frames 23, will function to hold the plate 21 to the carrier C.

Each arbor frame 23 has the bore 36 within which an arbor 37 is movable for projection of its outer portion across the periphery of the carrier C, the arbors 37, when projected, engaging through the hinge loops 38 of the links L which are to be tested, as shown on Figures 1, 2, 5 and 6.

During operation of the machine, the carrier C rotates in counter-clockwise direction. Extending in clockwise direction from the inner end of each arbor frame 23 and below the associated arbor frame 22, are arms 39, these arms 39 extending along the rear side of the carrier web 19. Adjacent to the ends of the arms 39, the carrier web 19 has clearance openings 40 for the passage of bolts 41 from the ends of the arms 39 to the front side of the carrier disk 19 where each bolt journals a cam roller 42. Spacers or washers 43 are interposed between the arms 39 and the front portions of the bolts which journal the rollers 42.

Disposed in the path of the rollers 42 as the carrier rotates in counter-clockwise direction, is a cam plate 44 which is secured to the inner end of a test lever 45 which is fulcrumed intermediate its ends on the cross rod 13. Outwardly of the lever fulcrum, a rod 46 is connected to the lever by a pin 47. At its lower end the rod is threaded for a nut 48 which supports a washer 49. Within a housing 50 extending from the wall 10 is a spring 51 which abuts the washer 49 and the top wall 52 of the housing, through which top wall the rod 46 extends. By adjustment of the nut 48 on the rod 46 the spring 49 is set for a given tension, and the spring tends to swing the lever 45 counter-clockwise for exertion of radial outward pressure by the cam plate 44 against the rollers 42 engaged thereby when the carrier C rotates. As will be described more in detail later, as the carrier rotates, links are successively fed into position on the carrier rim to receive the arbors on the test sets when the arbors are projected, and the test sets, each with a link thereon, are carried past the cam plate 44. As the cam roller 42 on the arbor frame 23 of a test set T travels over the cam plate, the arbor frame 23 is rocked to swing its upper arbor receiving portion away from the associated arbor frame 22 so that the link on the arbors is subjected to a stretching test, as shown at the top of Figure 1. If the stretch of the tested link is within predetermined tolerance, the link will eventually be released from the arbors by discharge means to be described later, and to be conveyed away in one direction from the machine to a delivery point for accepted links. However, if the stretch of the link is beyond the predetermined tolerance, then the discharge means will function to side-track the link for discharge in another direction from the machine.

Describing now the link feeding-in arrangement, the links L to be tested straddle and move down along a delivery bar 53, the links being suspended by their hinge loops 38. On the carrier rim 20 are sets of teeth 54 and 55 adjacent to the arbor receiving bores 24 of the arbor frames 22, and as the carrier revolves, each set of teeth engages the lower end of a link received from the feed bar 53 and this link will then swing down against the carrier rim to be in position to receive the arbors 25 and 37 when these arbors are projected. Figure 2 shows a link L carried by one of the sets of teeth in position for receiving the arbors of the corresponding test set. When the arbors are projected, the link loops will be received thereon and the test set will carry the link through the testing field for a stretch test.

Describing now the arbor shift controlling mechanism, and referring particularly to Figures 1, 5 and 6, the arbors 25 and 37 of each set have a coupling pin 56 extending through their rear ends to cause the arbors to move axially together but permitting separation movement thereof for stretch testing of a link thereon. Each arbor 25 has a stud 57 extending therefrom for journalling a cam roller 58, a longitudinal slot 59 being provided in each frame 22 through which the stud extends and through which the stud may move for shift of the arbor.

Mounted on the cross bars 15 and 16 is a frame 60 supporting a fulcrum pin 61 which is secured to the lower end of a cam bar 62 which extends into the path of the cam rollers 58 when the carrier C is rotated. The cam bar is yieldably held in such position by the force of a spring 63 which seats on a step plate 64 secured to the lower end of the frame 60. The upper end of the spring abuts the arm 65 secured to the fulcrum pin 61 to which the cam bar 62 is secured, and an adjustable bolt 66 extends through the spring and abuts the outer sides of the said plate and the arm 65. By means of the bolt the spring may be properly tensioned and during normal operation of the machine the spring will hold the cam bar 62 in proper position for engagement by the cam rollers 58. However, should projection of the arbors be blocked, as may sometimes happen when the arbors encounter a link not properly fed into position, the spring will allow the cam bar to yield and thus prevent injury to the machine.

Referring to Figure 5, the lower testing set is the one shown on Figure 2 in front of which a link 1 has just been received. The cam roller 58 has traveled a distance along the cam bar 62 but not far enough for projection of the arbors. As the carrier proceeds, the cam roller 58 will travel along the cam bar and the arbors will be projected for reception of the link loops, the link being backed up by the annular wall 21 while the arbors are projected into the link loops, and when the roller reaches the end of the cam arm the link will have been fully received by the arbors as shown on the top of Figure 5. As the carrier now proceeds, the testing set with the link thereon is carried through the testing field for engagement of the cam roller 42 with the cam plate 44, and then after the test, the arbor withdrawing field is reached in which the cam roller engages the cam 67 for withdrawal of the arbors from the link. This cam is supported on a block 68 which is mounted on the cross bars 13 and 14 of the supporting frame structure, as shown on Figure 6.

Upon engagement of a test set with the cam plate 44 the link thereon is subjected to a stretching test by the force of the spring 51. If such stretch is within predetermined tolerance, the link will be discharged from the machine in one direction, but if the stretch has been beyond the permitted tolerance, the link will be discharged from the machine in another direction. Referring to Figure 1, a micro-switch 69 controls the operation of the discharge or ejector mechanisms, this switch being mounted on the housing 50 for the spring 51. At the outer end of the testing lever 45 an abutment 70 is provided for engagement with the switch button 71. As shown, the abutment 70 is in the form of a pin threading through the test lever so that it may be adjusted, and then held in the adjusted position by a lock nut 72. If the test stretching of a link is within permitted tolerance, the test lever 45 will not be rocked far enough for engagement of its abutment with the switch button for the closure of the switch. However, if the stretch exceeds the permitted tolerance then the lever 45 will swing far enough for closure of the switch. After closure of the switch, further swing of the test lever is prevented by the engagement of a stop screw 73 with the top of the housing 50.

Referring to Figure 4, each of the bolts B which support the arbor frames 23 has a bore 74 therethrough for a rod 75. These rods control the operation of the ejecting mechanism for the ejection of links which have not satisfied the stretching test. The discharge or ejecting mechanism is normally set for discharge in one direction from the machine of the links which have satisfied the test, but when the link being tested stretches beyond the permitted tolerance, and the switch 69 is closed by the test lever, the rod for the corresponding testing set is projected by a solenoid S whose circuit is controlled by the switch, and the projected end of the rod sets the ejection mechanism for discharge of the link from the machine in another direction. The solenoid is mounted on the supporting frame wall 11 in the path of the rear ends of the rods 75 as the carrier C rotates. Normally the rods 75 are withdrawn with their outer ends within the bores 74 so that the rods will not engage with the ejection mechanism which then remains in its normal position. The solenoid, as shown on Figure 1, is mounted so that the rod in the testing set on which a link is being subjected to a stretch test, will be in front of the solenoid armature. Then if the link is stretched beyond the permissible tolerance, the test lever will close the switch for energization of the solenoid and forward shift of its armature and the rod engaged thereby, the switch and solenoid being included in circuit with a suitable source of current (not shown).

The discharge mechanism is best shown on Figures 2, 7 and 8. Secured on the bolt 12 at the left end of the machine is a conveyor plate 76 which is in alignment with the carrier. At its inner end the plate has a semi-circular recess 76' and mounted on the bolt 12 in engagement with the inner side of the plate 76 is the supporting plate 77 held against rotational movement as by a pin 78 extending therethrough and through the plate 76. At its upper end the plate 77 journals the rear end of a shaft 79 whose front end is journaled in the wall 10, (Figures 1 and 7). Secured to and extending upwardly from the shaft 79 is the ejector plate 80 with its lower end within the recess 76' of the plate 76 and with its upper portion tapered to a point to terminate at the periphery of the carrier C substantially midway between the carrier sides, as shown on Figure 7. When this ejector plate is in its normal position, as shown on Figure 2, it will be in the path of accepted links as they are released from the arbors, and the links, after release from the arbors, swing down to straddle the ejector plate and move down to the conveyor plate 76 to be suspended thereon by their hinge loops 38.

Referring to Figures 1, 7 and 8, a bar 81 extends radially along the inner side of the wall 10 and has the stem 82 in its inner end extending to the guide block 83 secured against the inner side of the wall 10 by a stud 84. A spring 85 between the block and a collar 86 on the stem tends to hold the bar seated inwardly against the block. At its outer end the bar 81 is connected to an arm 87 secured to and extending upwardly from the shaft 79. Extending upwardly from the bar is a cam plate 88 having the inner cam edge 89 which is disposed in front of the path of the front ends of the bushings B through which the rods 75 extend. The spring 85 tends to hold the bar 81 inwardly for setting of the shaft 79 through the lever 87 to hold the ejector plate 80 in its normal position for reception of links which have satisfied the stretching test so that these links may be received by the ejector plate for the delivery to the conveyor 76, as shown on Figure 2. However, should a link fail to satisfy the stretching test, the switch 69 will be closed for operation of the solenoid S to shift forwardly the rod 75 on the testing set on which the link is being tested, and then, as the testing set with the link thereon reaches the release cam 67 for withdrawal of the arbors from the link, the projected rod 75 will encounter the cam edge 89 of the cam 88 and the bar 81 will be shifted outwardly for outward swing of the ejector plate 80 so that the defective released link will drop down along the inside of the ejector plate to be discharged downwardly from the machine. Thus only links which have satisfied the stretching test will reach the conveyor 76. On Figure 8 the dotted lines indicate the movement of the bar by a projected rod.

Before the roller 42 on the testing set engaged by the cam 44 leaves the cam, the roller on the next testing set will come into engagement with the cam plate and the switch 69 will therefore be closed only when a tested link stretches beyond permissible tolerance. When a rod 75 is shifted out by the solenoid armature and the switch is closed, the switch is reopened when the next testing set roller engages the cam plate 44 for return of the testing lever 45, and the solenoid is then de-energized, and its armature is retracted by the spring 90. The rod however remains in its forwardly shifted position for engagement with the cam 88 on the bar 81 for setting of the ejector plate 80 to side-track the defective link from the conveyor 76, and eventually the end of the projected rod comes into engagement with a cam 91 on the inner side of the wall 10, Figures 1 and 7, and the rod is shifted back to its normal position.

Referring to Figures 6 and 7, the carrier is of slightly reduced diameter between the teeth 54 and 55 thereon so as to provide the circumferential channel 92 between the teeth. This channel serves to receive the hinge loops 38 of the links as the arbors are being withdrawn therefrom after the link has been tested. Referring to Figure 6, the roller 58 on one of the test sets is just coming into engagement with the arbor withdrawing cam 67. As the cam roller continues along the cam the arbors will be withdrawn and the hinge loop arbor 37 will leave the hinge loop before the arbor 25 is fully withdrawn from the outer loop 29, and the link will then swing down for engagement of its hinge loop in the channel 92. During final withdrawal of the arbors, the hinge loop will then abut against the rear side of the channel 92 and the loop 28 will abut the arbor frame 22 so that the arbors may be fully withdrawn without canting of the link.

Referring to Figure 2, escapement means are preferably provided for insuring orderly feed of the links from the feed bar 53 to the carrier C and to prevent piling up of links in front of the carrier. The escapement mechanism shown comprising a sleeve 93 rotatable on the cross bar 16 but held against longitudinal movement thereon. Secured on the sleeve in alignment with the feed bar 53 is the escapement lever 94 whose upper portion is split and receives a screw 95 so that the lever may be adjustably clamped to the sleeve. A spring 96 between the upper end of the lever and the cross bar 15 tends to hold the lever with the end of the screw 95 against the bar 15. The lower end of the lever projects in front of the row of links on the feed bar 53 behind the link 1 which is being received by the carrier to hold back the row of links and to permit only one by one feed of the links to the carrier.

Adjustably secured on the sleeve 93 rearwardly of the lever 94 and in alignment with the arbor supporting frames on the carrier is a wiper arm 97. The wiper arm is in advance of the testing set which receives a link 1 from the feed bar 53, and its inner end is released from the arbor frames of the preceding testing set on the carrier so that the lower end of the escapement lever 94 may hold the row of links on the feed bar away from the link 1 until this link has been carried away from the feed bar by its corresponding testing set for engagement of the testing set with the arbor projecting cam. As the arbor frames of the testing set for the link 1 now reach the wiper arm 97, the arm will be rocked clockwise for rotation of the sleeve and clockwise rotation of the escapement arm 94 from in front of the row of links on the feed bar for movement of the next or front link of the row onto the carrier, but the wiper arm will then be released from the arbor frames for return of the escapement arm by the spring 96 into position in front of the next link of the row on the feed bar, so that only one link at a time may enter the carrier and the oncoming links will be held back so as not to interfere with the travel of the links with the carrier. The friction drag of the wiper arm over the arbor frames of a testing set will also function to swing the arbor frame 23 against the frame 22 before the arbors are projected to receive a link.

We have thus produced a very practical and efficient link testing machine of increased capacity in which the testing sets travel continuously through a feeding field, a stretch testing field and an ejection field, with automatically controlled ejection of accepted links in one direction from the machine and ejection in another direction of rejected links. We do not desire to be limited to the exact construction, arrangement and operation shown and described as changes are possible which will still come within the scope of the invention.

We claim as follows:

1. A stretch testing machine for metallic links of the type disclosed, comprising a continuously rotatable carrier, a plurality of testing sets mounted on said carrier for travel through an orbit when the carrier rotates, each testing set comprising an arbor for receiving the hinge loop of a link and a second arbor for receiving the cartridge receiving loops of a link and separable supporting frames for said arbors, means for feeding links to said testing sets, means in the path of said testing sets for effecting projection of the test set arbors for reception of the link loops, means in the path of said testing sets for effecting separation of the arbor supporting frames and arbors for stretch testing of the link on the arbors, means in the path of said testing sets for effecting withdrawal of the arbors from a tested link, and means for ejecting tested links from the machine.

2. A stretch testing machine for metallic links of the type disclosed, comprising a continuously rotatable carrier, a testing set mounted on said carrier for travel through an orbit, said testing set comprising separable frames and an arbor shiftable in each frame, one of said arbors for engaging through the hinge loop of a link and the other arbor for engaging through the cartridge receiving loops of the link, link feed mechanism, means on said carrier adjacent to said testing set for successively receiving a link from said feed mechanism for position thereof in front of said testing set, means in the path of said testing set for effecting shift of said arbors for engagement in the respective link loops, means in the path of said testing set for effecting separation of said testing set frames and arbors therein for stretch test of the link under predetermined tension, and means in the path of said testing set for withdrawing said arbors from the tested link for ejection of the link from the machine.

3. A stretch testing machine for metallic links of the type disclosed, comprising a continuously rotatable carrier, a plurality of testing sets mounted on said carrier for bodily travel through an orbit when the carrier rotates, means for feeding links to the testing sets, means in the path of said testing sets for effecting operation thereof for mounting a link preparatory for testing thereof, testing means in the path of said sets effective to subject the links thereon to a stretch test, means in the path of said sets effective to release the tested links therefrom, and ejection means automatically controlled by the operation of said testing means to effect ejection in one direction from the machine of links which have satisfied the stretch test and to effect ejection in another direction from the machine of links which have not satisfied the stretching test.

4. A stretch testing machine for metallic links of the type disclosed, comprising a cylindrical carrier adapted to be continuously rotated, a plurality of testing sets extending laterally from one side of said carrier adjacent to the periphery thereof for bodily travel through an orbit when the carrier is rotated, each test set comprising one frame rigid with said carrier and another frame fulcrumed on said carrier for separation movement from said first frame, arbors in said frames connected for axial shift therein but free for lateral separation with separation movement of said frames, abutments on said carrier adjacent to each testing set for successively receiving links for alignment on the carrier in front of the corresponding testing sets, a cam roller for the arbors of each testing set and a cam engageable by said rollers for outward shift of said arbors for projection into the respective loops of a link, a cam roller on the fulcrumed frame of each testing set, a cam lever having a cam surface thereon in the path of said fulcrumed frame cam rollers and means subjecting said lever to pressure for application to an engaged cam roller for effecting swing of the test set fulcrumed frame for subjecting the link on the arbors of the set to a stretch test, a withdrawing cam in the path of the arbor cam rollers for effecting withdrawal of the arbors from a tested link, a switch controlled by said test lever and closed thereby only when a tested link fails to satisfy the stretch test, ejector means normally positioned to eject in one direction from the machine links which have satisfied the stretch test, a solenoid and a circuit therefor closed by said switch when said switch is closed by said test lever, and means controlled by said solenoid for setting said ejector means for ejection in another direction from the machine of links which have not satisfied the stretch test.

5. A stretch testing machine for metallic links of the type disclosed, comprising a cylindrical carrier adapted to be continuously rotated, a plurality of testing sets extending laterally from one side of said carrier adjacent to the periphery thereof for bodily travel through an orbit when the carrier is rotated, each test set comprising one frame rigid with said carrier and another frame fulcrumed on said carrier for separation movement from said first frame, arbors in said frames connected for axial shift therein but free for lateral separation with separation movement of said frames, abutments on said carrier adjacent to each testing set for successively receiving links for alignment on the carrier in front of the corresponding testing sets, a cam roller for the arbors of each testing set and a cam engageable by said rollers for outward shift of said arbors for projection into the respective loops of a link, a cam roller on the fulcrumed frame of each testing set, a cam lever having a cam surface thereon in the path of said fulcrumed frame cam rollers and means subjecting said lever to pressure for application to an engaged cam roller for effecting swing of the test set fulcrumed frame for subjecting the link on the arbors of the set to a stretch test, a withdrawing cam in the path of the arbor cam rollers for effecting withdrawal of the arbors from a tested link, a switch controlled by said test lever and closed thereby only when a tested link fails to satisfy the stretch test, ejector means normally positioned to eject in one direction from the machine links which have satisfied the stretch test, a solenoid and a circuit therefor controlled by said switch, a shiftable rod for each testing set alined with said solenoid while a link on the set is being tested and to be shifted by said solenoid upon failure of the tested link to satisfy the test, said rod when shifted being adapted to effect setting of the ejector means for ejection in another direction from the machine of the link which has failed to satisfy the test.

6. A stretch testing machine for metallic links of the type disclosed, comprising a continuously moving carrier, a plurality of testing sets mounted on said carrier for travel through an orbit, means for applying links to said testing sets, testing means in the path of said sets for subjecting links on said sets to a stretch test, means in the path of said sets effective to release the tested links therefrom, discharge mechanism for the tested links, a movable abutment on said carrier normally in inoperative position, said discharge mechanism being normally in position for receiving and discharging in one direction from the machine the links which have satisfied the stretch test, means controlled by said testing means when a tested link has failed to satisfy the stretch test for setting said abutment into operative position, and means then controlled by said abutment for setting said discharge means for discharge from the machine in another direction of the link which has failed to satisfy the stretch test.

7. A stretch testing machine for metallic links of the type disclosed, comprising a carrier adapted to be continuously rotated, a plurality of testing sets on said carrier for bodily travel through an orbit when the carrier is rotated, each testing set comprising a first frame rigid with said carrier and another frame fulcrumed on the carrier for separation movement from said first frame, arbors in said frames for receiving the link loops, means for feeding links to the arbors, rollers on said fulcrumed frames, a loaded test lever in the path of said rollers for engagement thereby for exertion of pressure against said rollers for separation of said frames for subjecting the links on said arbors to a stretch test, means in the path of said carrier for releasing tested links from the arbors, discharge mechanism normally in position to discharge from the machine in one direction the released links which have satisfied the stretch test, and means controlled by the testing movement of said test lever for setting said discharge mechanism for discharge from the machine in another direction of those links which have failed to satisfy the stretch test.

PER O. PERSSON.
CARL W. SPOHR.